United States Patent
Sohn

(10) Patent No.: US 8,702,818 B2
(45) Date of Patent: Apr. 22, 2014

(54) METHOD OF MANUFACTURING AN ELECTRODE ASSEMBLY FOR A RECHARGEABLE BATTERY

(75) Inventor: Young-Bae Sohn, Suwon-si (KR)

(73) Assignee: Samsung SDI Co., Ltd., Yongin (KR)

( * ) Notice: Subject to any disclaimer, the term of this patent is extended or adjusted under 35 U.S.C. 154(b) by 822 days.

(21) Appl. No.: 12/732,157

(22) Filed: Mar. 25, 2010

(65) Prior Publication Data

US 2011/0067227 A1    Mar. 24, 2011

Related U.S. Application Data

(60) Provisional application No. 61/243,908, filed on Sep. 18, 2009.

(51) Int. Cl.
*H01M 10/02* (2006.01)

(52) U.S. Cl.
USPC .............................. 29/623.1; 429/94; 429/211

(58) Field of Classification Search
USPC ................. 29/623.1–623.5; 429/122–347, 94
See application file for complete search history.

(56) References Cited

U.S. PATENT DOCUMENTS

| | | | |
|---|---|---|---|
| 6,627,343 B1 | 9/2003 | Kim et al. | |
| 2001/0004503 A1* | 6/2001 | Kondo | 429/94 |
| 2002/0061435 A1 | 5/2002 | Hisai | |
| 2009/0239133 A1 | 9/2009 | Kosugi | |

FOREIGN PATENT DOCUMENTS

| | | |
|---|---|---|
| DE | 10341355 A1 | 4/2005 |
| EP | 1207565 A2 | 5/2002 |
| EP | 1339115 A1 | 8/2003 |
| JP | 10-162861 | 6/1998 |
| JP | 2002-157991 | 5/2002 |
| JP | 2002-319410 | 10/2002 |
| KR | 10-0515832 | 9/2005 |
| WO | WO 2008-126538 | 10/2008 |

OTHER PUBLICATIONS

Machine Translation of DE 10341355 originally published to Brander et al. on Apr. 2005.*
European Search Report from corresponding Application No. 10250058.4 dated Sep. 29, 2010.
Examination Communication dated Apr. 5, 2013 for corresponding EP Application No. 10 250 058.4.
Office Action dated Feb. 7, 2014 for corresponding CN Application No. 201010287794.6.

* cited by examiner

Primary Examiner — Jonathan G Leong
(74) Attorney, Agent, or Firm — Knobbe, Martens, Olson & Bear, LLP

(57) ABSTRACT

A method of manufacturing an electrode assembly for a rechargeable battery is disclosed. The method comprises providing a first electrode plate comprising an active portion that is coated with a first active material and an inactive portion extending from an edge of the active portion of the first electrode plate; providing a second electrode plate comprising an active portion that is coated with a second active material and an inactive portion extending from an edge of the active portion of the second electrode plate; providing a separator; winding the first electrode plate, the second electrode plate and the separator, the separator interposed between the first and second electrode plates; and removing parts of the inactive portion of the first electrode plate and the inactive portion of the second electrode plate to form a first plurality of electrode tabs for the first electrode plate and a second plurality of electrode tabs for the second electrode plate.

10 Claims, 18 Drawing Sheets

METHOD OF MANUFACTURING AN ELECTRODE ASSEMBLY FOR A RECHARGEABLE BATTERY

RELATED APPLICATIONS

This application claims the benefit of U.S. Provisional Application. Ser. No. 61/243,908, filed on Sep. 18, 2009, the disclosure of which is incorporated herein by reference in its entirety.

BACKGROUND

1. Field

Embodiments of the present invention relate to a method of manufacturing an electrode assembly for a rechargeable battery, and more particularly, to a method of manufacturing an electrode assembly for a rechargeable battery, by which a plurality of tabs is easily formed.

2. Description of the Related Technology

Unlike primary batteries that cannot be recharged, rechargeable batteries are chargeable and dischargeable. Rechargeable batteries may be used in a wide range of applications including high-tech electronic devices, such as cellular phones, notebook computers, camcorders, or automobiles.

Rechargeable batteries can each include an electrode assembly and an electrolyte. The electrolyte can include lithium. The electrode assembly can include a positive electrode plate, a negative electrode plate, and a separator.

Each of the positive electrode plate and the negative electrode plate of the electrode assembly can include tabs protruding to the exterior. That is, the tabs can protrude outside the electrode assembly and be electrically connected to a container that houses the electrode assembly. The container may be a cylindrical can.

Recently, each of the positive electrode plate and the negative electrode plate has included a plurality of electrode plates in order to perform charging and discharging with a high-capacity current. However, since the electrode assembly is typically formed by winding the positive electrode plate, the negative electrode plate, and the separator, it is not easy to form a plurality of tabs having a uniform width located at predetermined positions.

SUMMARY

According to an embodiment, a method of manufacturing an electrode assembly for a rechargeable battery comprises providing a first electrode plate comprising an active portion that is coated with a first active material and an inactive portion extending from an edge of the active portion of the first electrode plate; providing a second electrode plate comprising an active portion that is coated with a second active material and an inactive portion extending from an edge of the active portion of the second electrode plate; providing a separator; winding the first electrode plate, the second electrode plate and the separator, the separator interposed between the first and second electrode plates; and removing parts of the inactive portion of the first electrode plate and the inactive portion of the second electrode plate to form a first plurality of electrode tabs for the first electrode plate and a second plurality of electrode tabs for the second electrode plate.

BRIEF DESCRIPTION OF THE DRAWINGS

The above and other features and advantages will become apparent to those of ordinary skill in the art by describing in detail various embodiments with reference to corresponding drawings, in which.

Figure 1:
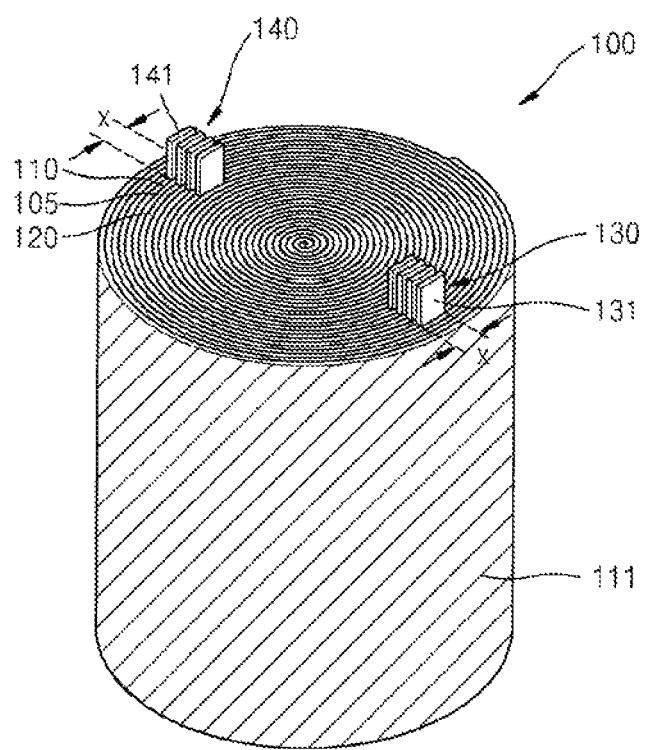
FIG. 1 illustrates a schematic view of the structure of a battery pack according to an embodiment.
Figure 3:
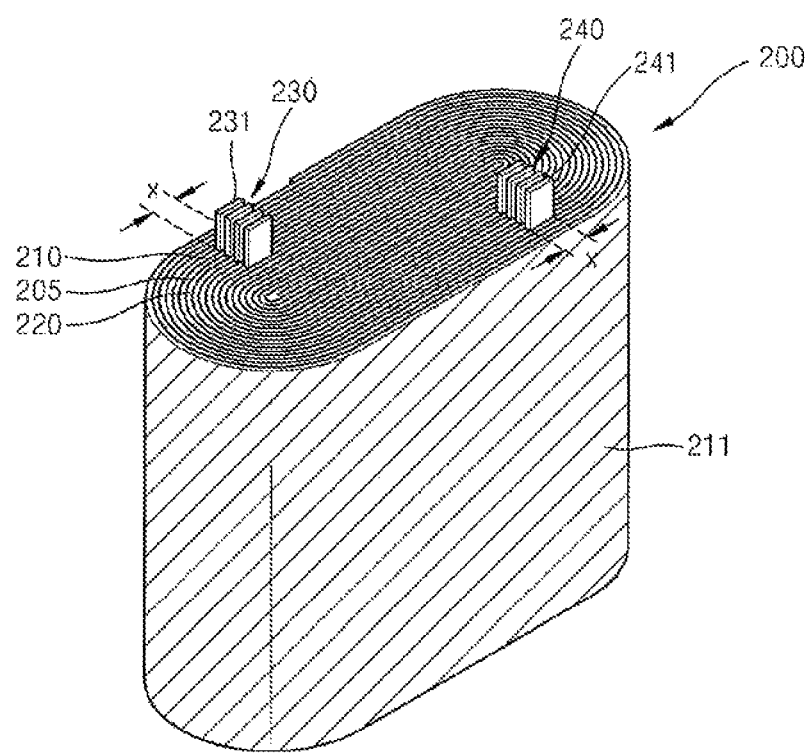
FIGS. 3 through 8 illustrate schematic views of a method of manufacturing a battery pack according to embodiments.
Figure 5:
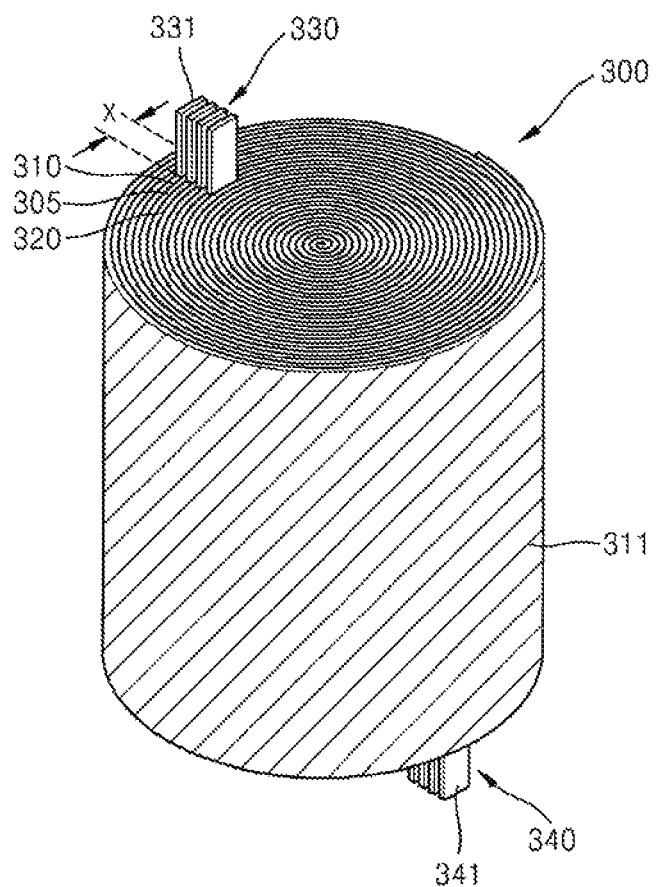
Figure 7:
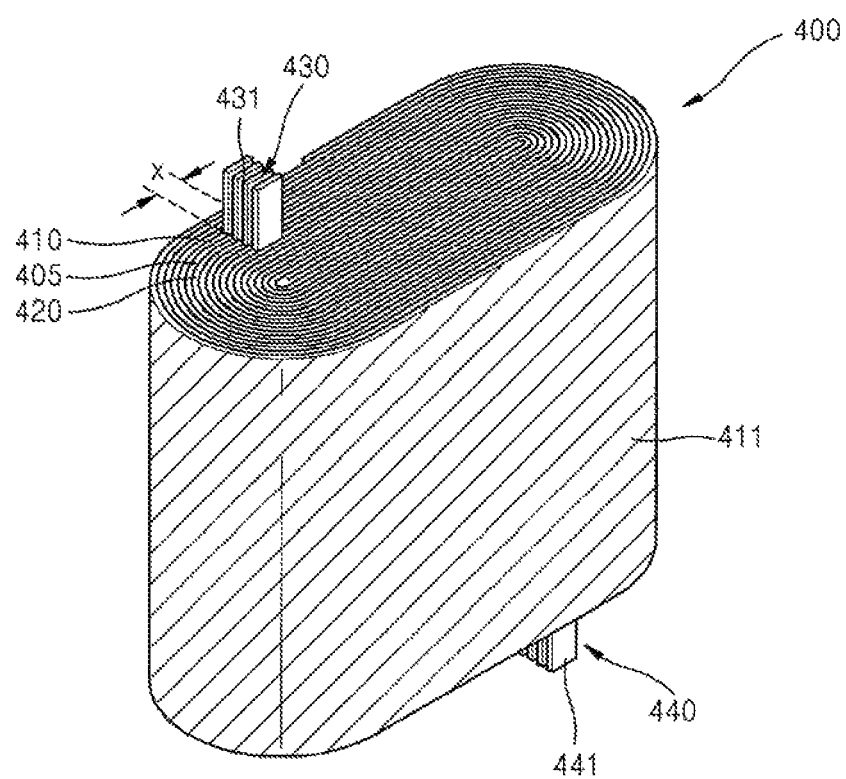

These and/or other aspects will become apparent and more readily appreciated from the following description of the embodiments, in conjunction with the accompanying drawings of which:

FIG. 1 is a schematic perspective view of an electrode assembly for a rechargeable battery, manufactured by using a method according to an embodiment of the present invention;

FIGS. 2A through 2D are views to sequentially explain processes of the method described with reference to FIG. 1;

FIG. 3 is a schematic perspective view of an electrode assembly for a rechargeable battery, manufactured by using a method according to another embodiment of the present invention;

FIGS. 4A through 4D are views to sequentially explain processes of the method described with reference to FIG. 3;

FIG. 5 is a schematic perspective view of an electrode assembly for a rechargeable battery, manufactured by using a method according to another embodiment of the present invention;

FIGS. 6A through 6D are views to sequentially explain processes of the method described with reference to FIG. 5;

FIG. 7 is a schematic perspective view of an electrode assembly for a rechargeable battery, manufactured by using a method according to another embodiment of the present invention; and FIGS. 8A through 8D are views to sequentially explain processes of the method described with reference to FIG. 7.

DETAILED DESCRIPTION

With reference to the drawings, the structure and operation of embodiments of the present invention will be described in detail.

FIG. 1 is a schematic perspective view of an electrode assembly 100 for a rechargeable battery, manufactured by using a method according to an embodiment of the present invention.

Referring to FIG. 1, the electrode assembly 100 may be manufactured by winding in such a manner that the electrode assembly 100 has a cylindrical shape. The electrode assembly 100 can include a separator 105, a first electrode plate 110, a second electrode plate 120, a first electrode tab group 130, and a second electrode tab group 140. For example, the electrode assembly 100 may be formed by winding the first electrode plate 110, the second electrode plate 120, and the separator 105, and the separator 105 may be interposed between the first electrode plate 110 and the second electrode plate 120 in such a manner that the first electrode plate 110 is insulated from the second electrode plate 120. The separator 105 may include an insulating material.

The first electrode tab group 130 and the second electrode tab group 140 all may be formed on the same side of the electrode assembly 100. In FIG. 1, the first electrode tab group 130 and the second electrode tab group 140 may be formed on a top side of the electrode assembly 100.

The first electrode tab group 130 may be connected to the first electrode plate 110, and the second electrode tab group 140 may be connected to the second electrode plate 120. However, embodiments of the present invention are not limited thereto. For example, the first electrode tab group 130 and the first electrode plate 110 may be integrally formed, and the second electrode tab group 140 and the second electrode plate 120 may be integrally formed.

The first electrode plate 110 may be a positive electrode plate, and the second electrode plate 120 may be a negative electrode plate. However, embodiments of the present invention are not limited thereto and the polarity of the respective plates may be altered. To more easily describe embodiments of the present invention, the first electrode plate 110 can be assumed to be a positive electrode plate, and the second electrode plate 120 can be assumed to be a negative electrode plate.

The first electrode plate 110 may include a first active material portion 111 including a positive electrode active material. The second electrode plate 120 may include a second active material portion (not shown) including a negative electrode active material. Although the first active material portion 111 of the first electrode plate 110 is exposed to the exterior in the embodiment shown in FIG. 1, the electrode assembly 100 may also be wound such that the second active material portion of the second electrode plate 120 is exposed outside.

The first electrode tab group 130 may include a plurality of first electrode tabs 131, and the second electrode tab group 140 may include a plurality of second electrode tabs 141.

The first electrode tabs 131 of the first electrode tab group 130 may have the same width X, and side surfaces of the first electrode tabs 131 may be parallel to each other.

The second electrode tabs 141 of the second electrode tab group 140 may have the same width X. The width X of the second electrode tabs 141 may be identical to the width X of the first electrode tabs 131. However, according to another embodiment, the width of the second electrode tabs 141 may also be different from the width of the first electrode tab 131. Side surfaces of the second electrode tabs 141 may be parallel to each other.

The cylindrical electrode assembly 100 may be placed in a container such as a cylindrical can and then, an electrolyte is injected into the container and then, the container may be sealed, thereby manufacturing a battery. In this regard, each of the first electrode tab group 130 and the second electrode tab group 140 may include a plurality of electrode tabs. Through the electrode tabs, the battery may be easily charged and discharged with a high-capacity current.

FIGS. 2A through 2D are views to sequentially explain processes of the method described with reference to FIG. 1.

Figure 2A:
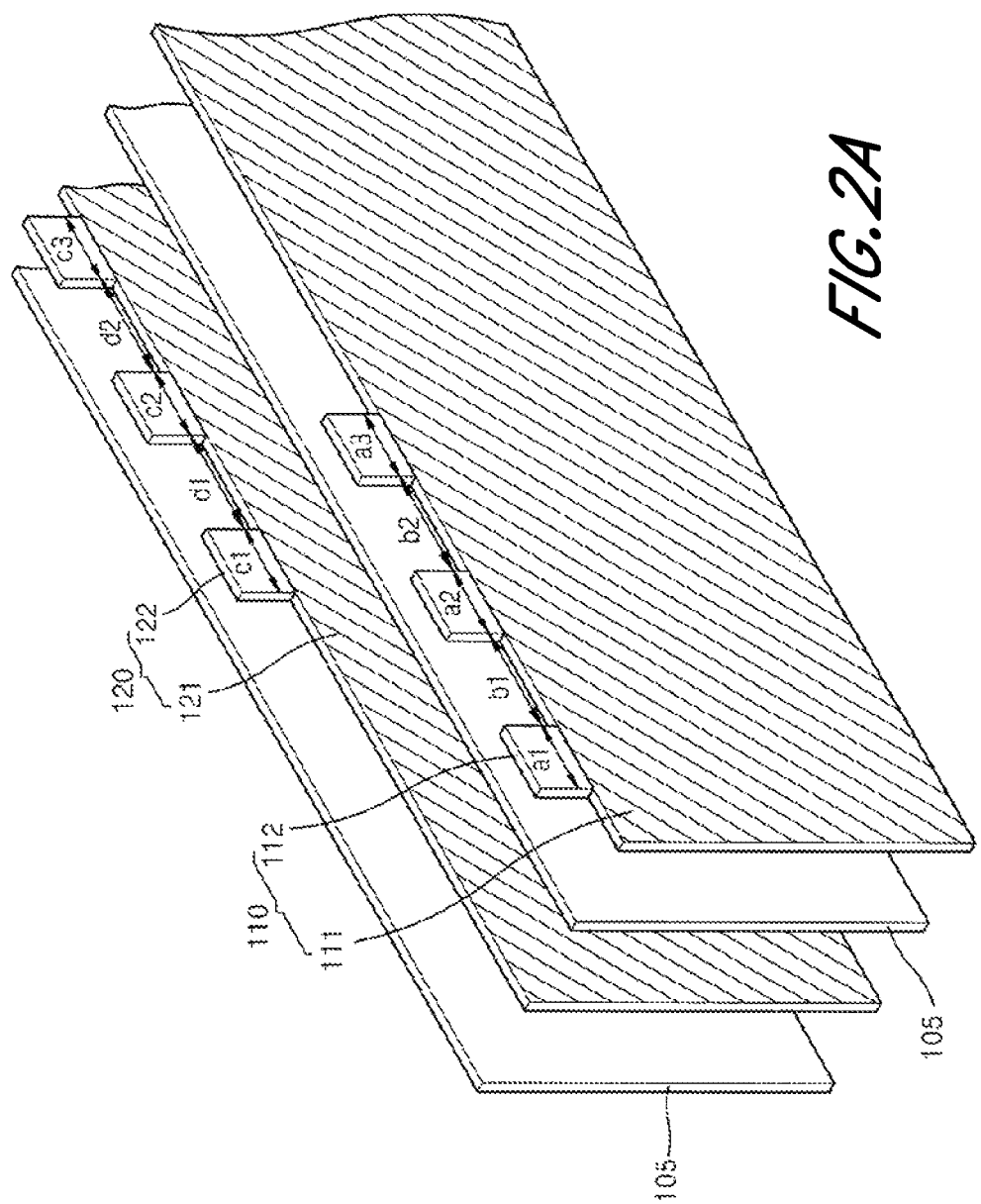
FIG. 2 illustrates a flow chart of a method of manufacturing a battery pack according to an embodiment.

Referring to FIG. 2A, the first electrode plate 110, the separator 105, and the second electrode plate 120 can be prepared for stacking.

The first electrode plate 110 may include a first active material portion 111 that includes a positive electrode active material, and a plurality of first un-coated portions 112 that do not include the positive electrode active material. For example, the first electrode plate 110 may be formed by coating a positive electrode active material on a predetermined portion of a metal thin plate such as an aluminum thin plate. In this regard, a portion that is coated with the positive electrode active material is referred to as the first active material portion 111, and a portion that is not coated is referred to as the first un-coated portion 112. The positive electrode active material may include, for example, a mixture including a lithium-based oxide, a binder, a plasticizer, and a conducting agent.

The first un-coated portions 112 may be aligned on a top side of the first active material portion 111 along the lengthwise direction of the first electrode plate 110, and have predetermined widths. The first un-coated portions 112 may have widths a1, a2, and a3, respectively, and the first un-coated portions 112 may be spaced apart from each other by distances b1 and b2. In this regard, the widths a1, a2, and a3 of the first un-coated portions 112 may be identical to each other, and the distances b1 and b2 of the first un-coated portion 112 may also be identical to each other. Accordingly, the first electrode plate 110 may be easily manufactured. Although FIG. 2A illustrates three first un-coated portions 112, the number of the first un-coated portions 112 may vary.

In the illustrated embodiment, the first un-coated portions 112 and the first electrode plate 110 are integrally formed. However, embodiments of the invention are not limited thereto. For example, the first electrode plate 110 and the first un-coated portions 112 may be separately formed, and then, the first un-coated portions 112 may be connected to the first electrode plate 110. The connection method may vary; for example, a welding method may be used.

The second electrode plate 120 can include a second active material portion 121 that further includes a negative electrode active material, and a plurality of second un-coated portions 122 that do not include the negative electrode active material. For example, the second electrode plate 120 may be formed by coating a negative electrode active material on a predetermined portion of a metal thin plate, such as a copper thin plate or a nickel thin plate. In this regard, a portion that is coated with the negative electrode active material may be referred to as the second active material portion 121, and a portion that is not coated may be referred to as the second un-coated portion 122. The negative electrode active material may include, for example, a mixture including a carbonaceous material, a binder, a plasticizer, and a conducting agent.

The second un-coated portions 122 may be aligned on a top side of the second active material portion 121 along the lengthwise direction of the second electrode plate 120, and may have predetermined widths. The second un-coated portions 122 may include widths c1, c2, and c3, and the second un-coated portions 122 may be spaced apart from each other by distance d1 and d2. In this regard, the widths c1, c2, and c3 of the second un-coated portions 122 may be identical to each other, and the distance d1 and d2 of the second un-coated portions 122 may be identical to each other. Accordingly, the second electrode plate 120 may be easily manufactured. Although FIG. 2A illustrates three second un-coated portions 122, the number of second un-coated portions 122 may vary.

In the present embodiment, the second un-coated portions 122 and the second electrode plate 120 may be integrally formed. However, embodiments of the present invention are not limited thereto. For example, the second electrode plate 120 and the second un-coated portions 122 may be separately formed, and then the second un-coated portions 122 may be connected to the second electrode plate 120. The connection method may vary; for example, a welding method may be used.

The widths a1, a2, and a3 of the first un-coated portions 112 may be identical to the widths c1, c2, and c3 of the second un-coated portions 122, and the distances b1 and b2 of the first un-coated portions 112 may be identical to the distances d1 and d2 of the second un-coated portions 122. Thus, in the subsequent process, the first electrode tab group 130 and second electrode tab group 140 having the same widths may be easily manufactured. In this regard, since the first un-coated portions 112 and the second un-coated portions 122 respectively form the first electrode tab group 130 and the second electrode tab group 140 in the subsequent process and the first electrode tab group and the second electrode tab group have different polarity, the first un-coated portions 112 need not be electrically connected to the second un-coated portions 122.

Thus, the first un-coated portions 112 and the second un-coated portions 122 are disposed such that the first un-coated portions 112 do not overlap with and are spaced apart from the second un-coated portions 122 as far as possible after the winding. Accordingly, as illustrated in FIG. 2A, with reference to the lengthwise directions of the first electrode plate 110 and the second electrode plate 120, positions of the first un-coated portions 112 are different from positions of the second un-coated portions 122.

When the first electrode plate 110 and the second electrode plate 120 are stacked and wound, a separator 105 may be used to prevent the first electrode plate 110 and the second electrode plate 120 from being electrically connected to each other. The separator 105 may include any material that has excellent insulating characteristics and is flexible.

Figure 2B:
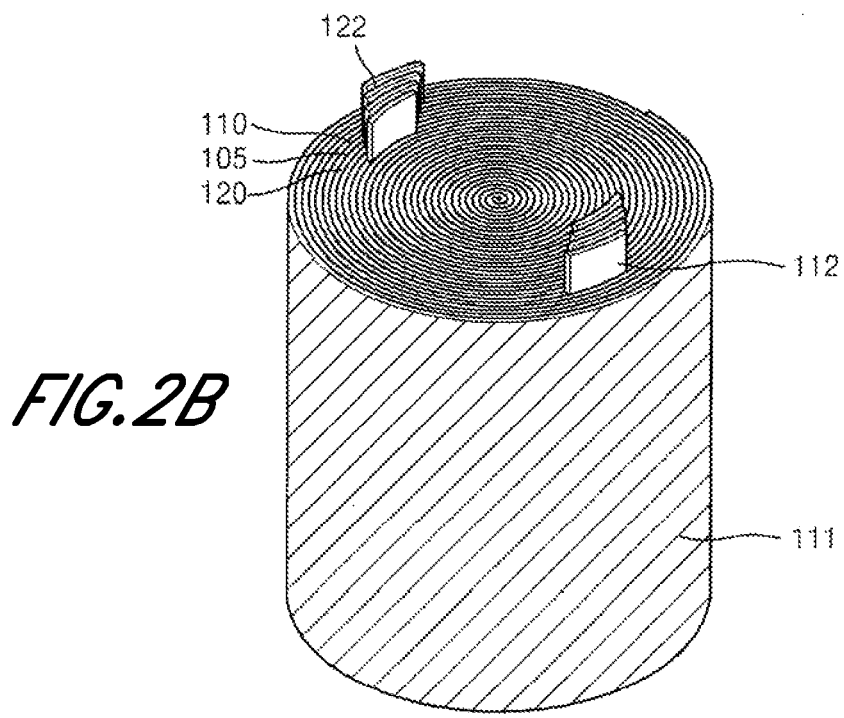

Then, referring to FIG. 2B, the stack including the first electrode plate 110, the second electrode plate 120 and the separator 105 can be wound. Referring to FIG. 2B, the first electrode plate 110, the second electrode plate 120, and the separator 105 can be wound while the first electrode plate 110 is exposed outside, thereby exposing the first active material portion 111 of the first electrode plate 110. However, embodiments of the present invention are not limited thereto. For example, the first electrode plate 110, the second electrode plate 120, and the separator 105 may be wound while the second electrode plate 120 is exposed outside, thereby exposing the second active material portion 121 of the second electrode plate 120.

The first un-coated portions 112 may be misaligned. That is, side surfaces of the first un-coated portions 112 may not be parallel to each other. Although the first un-coated portions 112 may have the same widths a1, a2, and a3, since the first un-coated portions 112 are spaced apart from each other by distances b1 and b2 and the winding diameter changes when the first electrode plate 110 is wound, the first un-coated portions 112 can become misaligned.

In order to prevent misalignment of the first un-coated portions 112 and to obtain parallel side surfaces of the first un-coated portions 112, the distances b1 and b2 among the first un-coated portions 112 should be adjusted. The distances b1 and b2 of the first un-coated portions 112 may be adjusted by considering the thickness of the first electrode plate 110, the thickness of the second electrode plate 120, and the thickness of the separator 105, which requires complicated calculation. In addition, even when the distances b1 and b2 among the first un-coated portions 112 are adjusted by considering such factors, the first un-coated portions 112 may also be misaligned according to the shape of the winding structure after winding and the winding density during winding.

However, according to embodiments of the present invention, positions of the first un-coated portions 112 need not be uniform. Thus, complicated calculations for adjusting of the distances b1 and b2 among the first un-coated portions 112 are not required.

Likewise, side surfaces of the second un-coated portions 122 may not be parallel to each other. Although the widths c1, c2, and c3 of the second un-coated portions 122 may be identical to each other, since the distances d1 and d2 of the second un-coated portions 122 may also be identical to each other, first un-coated portions 112 can become misaligned while winding the first electrode plate 110.

Figure 2C:
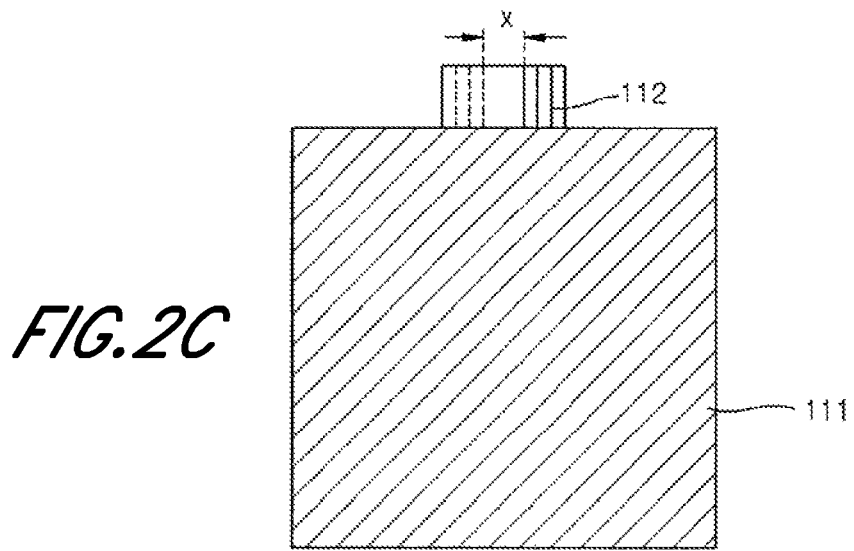

FIG. 2C is a front view of FIG. 2B. FIG. 2C illustrates the first un-coated portions 112 and does not illustrate the second un-coated portions 122, to clearly describe the present embodiment. The dashed lines represent left side surfaces of the first un-coated portions 112 which are shielded by a left side surface of the leftmost first un-coated portion 112.

Referring to FIG. 2C, the first un-coated portions 112 are misaligned to each other, and the side surfaces of the first un-coated portions 112 are not parallel to each other and only portions of the respective first un-coated portions 112 corresponding to a predetermined length X overlap with each other.

Like the first un-coated portions 112, the second un-coated portions 122 (not shown in FIG. 2C) are also misaligned and only portions of the respective second un-coated portions 122 corresponding to the predetermined length X overlap with each other.

Figure 2D:
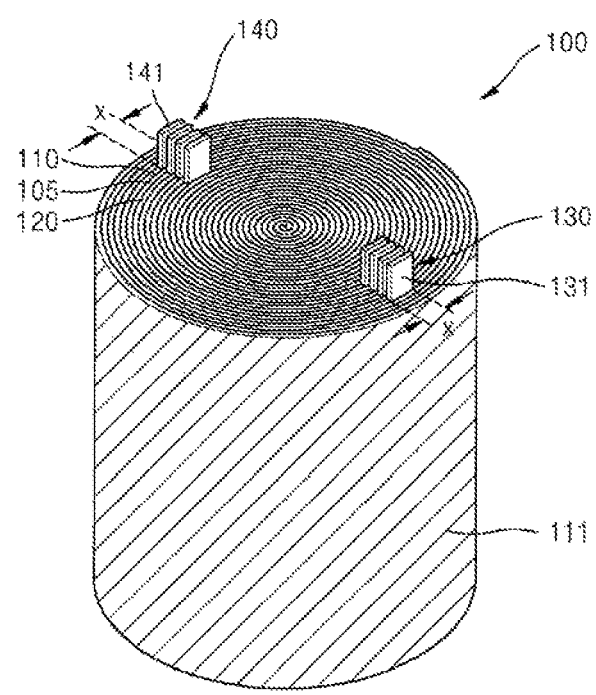

Then, referring to FIG. 2D, the other portions of the first un-coated portions 112 other than the overlapping portions can be removed. Thus, the first electrode tab group 130 including the first electrode tabs 131 having a width X can be formed. Likewise, the other portions of the second un-coated portions 122 other than the overlapping portions can be removed. Thus, the second electrode tab group 140 including the second electrode tabs 141 having a width X can be formed.

The process of removing predetermined portions of the first un-coated portions 112 and the second un-coated portions 122 may be a cutting process using a laser. However, embodiments of the present invention are not limited. For example, a blanking process using a mold may also be used.

Thus, the electrode assembly 100 including the first electrode tab group 130 and the second electrode tab group 140 can be manufactured.

The electrode assembly 100 can include the first electrode tabs 131 connected to the first electrode plate 110 and the second electrode tabs 141 connected to the second electrode plate 120. Even when distances among un-coated portions are not controlled when a plurality of tabs are formed, since the other portions of the un-coated portions other than overlapping portions are removed using, for example, a laser apparatus, the first electrode tab group 130 including the first electrode tabs 131 having the same width and parallel side surfaces may be easily formed. The second electrode tab group 140 may also be easily formed likewise.

In the present embodiment, the first un-coated portions 112 and the first electrode plate 110 may be integrally formed, and thus, the first electrode tab group 130 and the first electrode plate 110 may be integrally formed. Likewise, the second un-coated portions 122 and the second electrode plate 120 may be integrally formed, and thus, the second electrode tab group 140 and the second electrode plate 120 may be integrally formed. Alternatively, as described above, the first un-coated portions 112 and the first electrode plate 110 may be separately formed and then, the first un-coated portions 112 may be connected to the first electrode plate 110. The second un-coated portions 122 and the second electrode plate 120 may also be separately formed and then, the second un-coated portions 122 may be connected to the second electrode plate 120.

FIG. 3 is a schematic perspective view of an electrode assembly 200 for a rechargeable battery, manufactured by using a method according to another embodiment of the present invention.

Referring to FIG. 3, the electrode assembly 200 can be manufactured by winding in such a manner that the electrode assembly 200 has flat side surfaces. The electrode assembly 200 can include a separator 205, a first electrode plate 210, a second electrode plate 220, a first electrode tab group 230, and a second electrode tab group 240.

The electrode assembly 200 according to the present embodiment is the same as the electrode assembly 100 of FIG. 1, except for the winding shape of the electrode assembly 200. Thus, elements of the electrode assembly 200 will not be described in detail.

The electrode assembly 200 illustrated in FIG. 3 may be placed in a container such as a rectangular can or a pouch and then, an electrolyte may be injected into the container. The container can then be sealed, thereby manufacturing a battery. In this regard, each of the first electrode tab group 230 and the second electrode tab group 240 can include a plurality of electrode tabs. Through the electrode tabs, the battery may be easily charged and discharged with a high-capacity current.

FIGS. 4A through 4D sequentially explain processes of the method described with reference to FIG. 3.

Figure 4A:
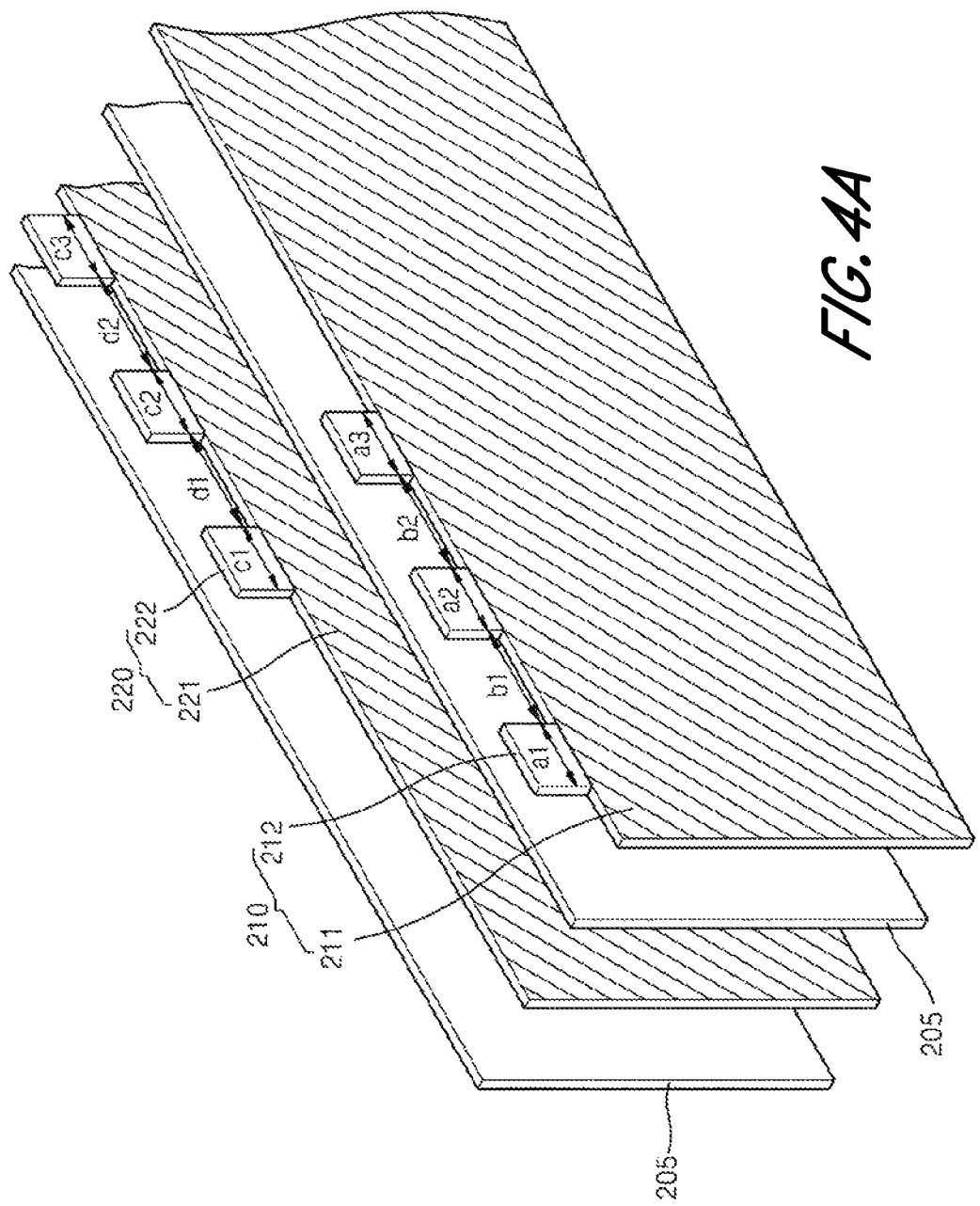

Referring to FIG. 4A, the first electrode plate 210, the separator 205, and the second electrode plate 220 are prepared for stacking.

The first electrode plate 210, the separator 205, and the second electrode plate 220 respectively correspond to the first electrode plate 110, the separator 105, and the second electrode plate 120, which have been described in the previous embodiment and thus, the first electrode plate 210, the separator 205, and the second electrode plate 220 will not be described in detail in the present embodiment. Like in the electrode assembly 100 of the previously described embodiment, the first electrode plate 210 and first un-coated portions 212 may be integrally formed. Alternatively, the first un-coated portions 212 may be separately formed and then connected to the first electrode plate 210. Likewise, the second electrode plate 220 and the second un-coated portions 222 may be integrally formed. Alternatively, the second un-coated portions 222 may be separately formed and then connected to the second electrode plate 220.

Figure 4B:
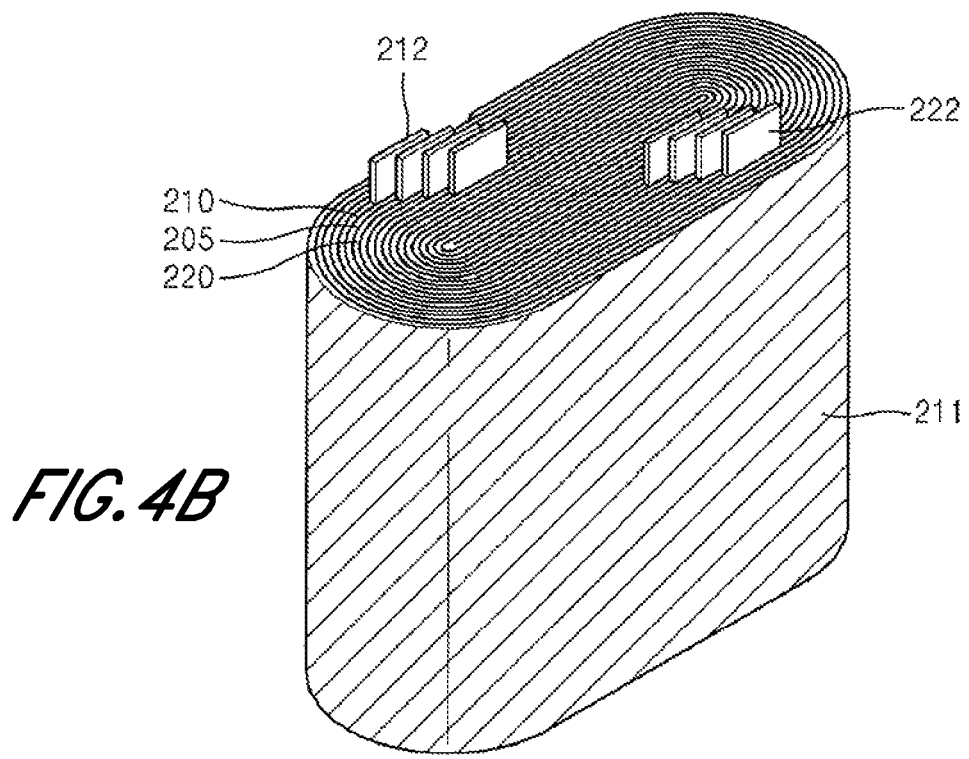

Referring to FIG. 4B, the stack including the first electrode plate 210, the second electrode plate 220, and the separator 205 may be wound. In the present embodiment, in order to manufacture an electrode assembly for a rectangular or pouch type battery, the first electrode plate 210, the second electrode plate 220, and the separator 205 are stacked and then wound such that the stack structure has flat side surfaces.

Referring to FIG. 4B, the first electrode plate 210, the second electrode plate 220, and the separator 205 may be wound while the first electrode plate 210 is exposed outside, thereby exposing a first active material portion 211 of the first electrode plate 210. However, embodiments of the present invention are not limited thereto. For example, the first electrode plate 210, the second electrode plate 220, and the separator 205 may be wound while the second electrode plate 220 is exposed outside, thereby exposing a second active material portion 221 of the second electrode plate 220.

The first un-coated portions 212 may be misaligned. That is, side surfaces of the first un-coated portions 212 may not be parallel to each other. Although the first un-coated portions 212 may have the same widths a1, a2, and a3, since the first un-coated portions 212 may be spaced apart from each other by the same distances b1 and b2 and the winding diameter changes when the first electrode plate 210 is wound, the first un-coated portions 212 may be misaligned.

Likewise, side surfaces of the second un-coated portions 222 may not be parallel to each other. Since the second un-coated portions 222 may have the same widths c1, c2, and c3 and the second un-coated portions 222 may be spaced apart from each other by the same distances d1 and d2, the first un-coated portions 212 may be misaligned when the first electrode plate 210 is wound.

Figure 4C:
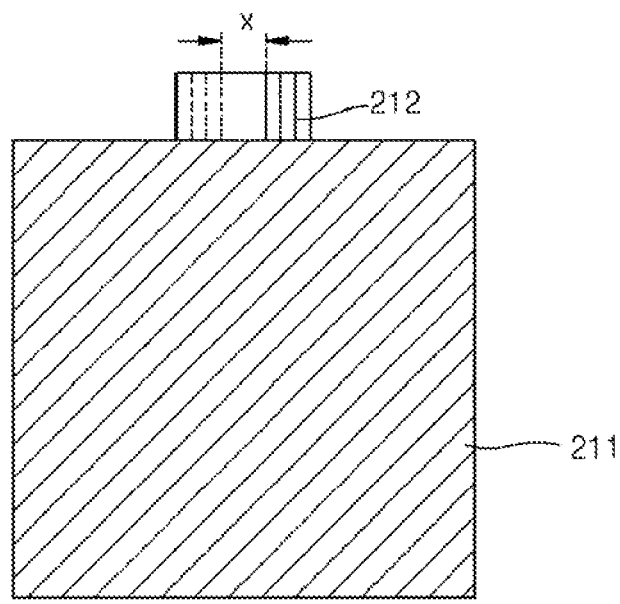

FIG. 4C is a front view of FIG. 4B. FIG. 4C illustrates the first un-coated portions 212 and do not illustrate the second un-coated portions 222, to clearly describe the present embodiment. The dashed lines represent left side surfaces of the first un-coated portions 212, which are shielded by a left side surface of the leftmost first un-coated portion 212.

Referring to FIG. 4C, the first un-coated portions 212 may be misaligned and side surfaces of the first un-coated portions 212 may not be parallel to each other and thus, only portions of the first un-coated portions 212 corresponding to a predetermined length X can overlap with each other.

Like the first un-coated portions 212, the second un-coated portions 222, which are not shown in FIG. 4C, may also be misaligned and thus, only portions of the second un-coated portions 222 corresponding to the predetermined length X can overlap with each other.

Figure 4D:
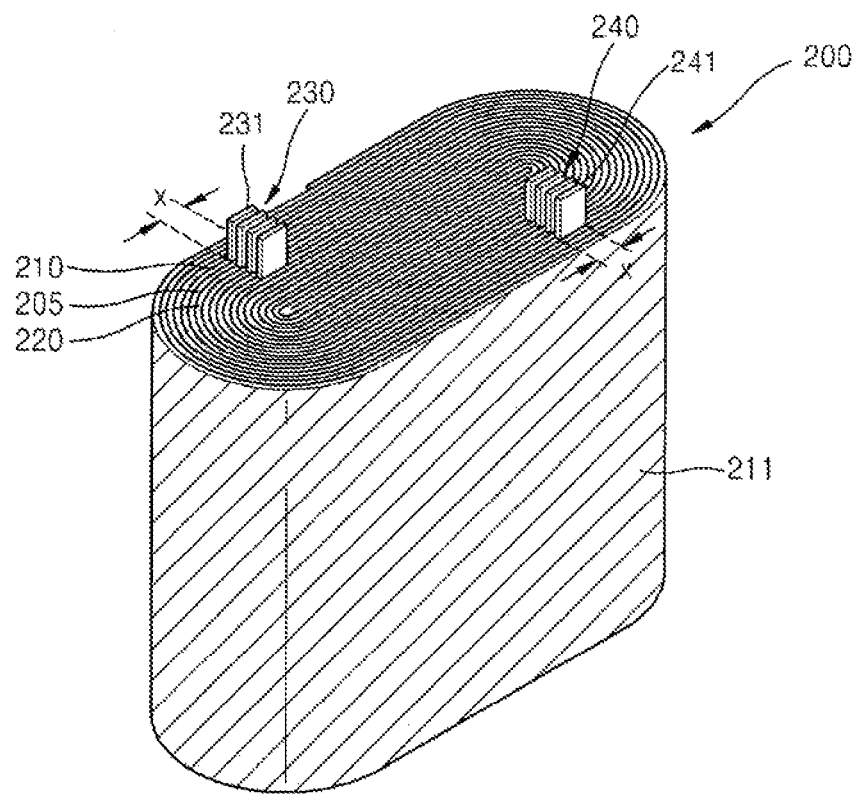

Referring to FIG. 4D, the other portions of the first un-coated portions 212 other than the overlapping portions can be removed. Thus, the first electrode tab group 230 including first electrode tabs 231 having the same width X may be formed. Likewise, the other portions of the second un-coated portions 222 other than the overlapping portions can be removed. Thus, the second electrode tab group 240 including second electrode tabs 241 having the same width X may be formed.

The process of removing predetermined portions of the first un-coated portions 212 and the second un-coated portions 222 may be a cutting process using a laser. However, embodiments of the present invention are not limited. For example, a blanking process using a mold may also be used.

Thus, the electrode assembly 200 including the first electrode tab group 230 and the second electrode tab group 240 can be manufactured.

The electrode assembly 200 can include the first electrode tabs 231 connected to the first electrode plate 210 and the second electrode tabs 241 connected to the second electrode plate 220. Even when distances among un-coated portions are not controlled when a plurality of tabs are formed, since the other portions of the un-coated portions other than overlapping portions are removed using, for example, a laser apparatus, the first electrode tab group 230 including the first electrode tabs 231 having the same width and parallel side surfaces may be easily formed, and the second electrode tab group 240 may also be easily formed likewise.

In the present illustrated embodiment, the first un-coated portions 212 and the first electrode plate 210 may be integrally formed, and thus, the first electrode tab group 230 and the first electrode plate 210 may be integrally formed. Likewise, the second un-coated portions 222 and the second electrode plate 220 may be integrally formed, and thus, the second electrode tab group 240 and the second electrode plate 220 may be integrally formed. Alternatively, as described above, the first un-coated portions 212 and the first electrode plate 210 may be separately formed and then, the first un-coated portions 212 may be connected to the first electrode plate 210. The second un-coated portions 222 and the second electrode plate 220 may be separately formed and then, the second un-coated portions 222 may be connected to the second electrode plate 220.

FIG. 5 is a schematic perspective view of an electrode assembly 300 for a rechargeable battery, manufactured by using a method according to another embodiment of the present invention.

Referring to FIG. 5, the electrode assembly 300 can be manufactured by winding in such a manner that the electrode assembly 300 has a cylindrical shape. The electrode assembly 300 can include a separator 305, a first electrode plate 310, a second electrode plate 320, a first electrode tab group 330, and a second electrode tab group 340. For example, the electrode assembly 300 may be formed by winding the first electrode plate 310, the second electrode plate 320, and the separator 305, and the separator 305 is interposed between the first electrode plate 310 and the second electrode plate 320 in such a manner that the first electrode plate 310 is insulated from the second electrode plate 320. The separator 305 may include an insulating material.

The first electrode tab group 330 may be formed on a top side of the electrode assembly 300, and the second electrode tab group 340 may be formed on a bottom side of the electrode assembly 300. However, embodiments of the present invention are not limited thereto. For example, the first electrode tab group 330 may be formed on the bottom side of the electrode assembly 300, and the second electrode tab group 340 may be formed on the to top side of the electrode assembly 300. That is, the first electrode tab group 330 and the second electrode tab group 340 can be formed on different sides of the electrode assembly 300.

The first electrode tab group 330 may be connected to the first electrode plate 310, and the second electrode tab group 340 may be connected to the second electrode plate 320. However, embodiments of the present invention are not limited thereto. For example, the first electrode tab group 330 and the first electrode plate 310 may be integrally formed, and the second electrode tab group 340 and the second electrode plate 320 may be integrally formed.

The first electrode plate 310 may include a first active material portion 311 including a positive electrode active material. The second electrode plate 320 may include a second active material portion (not shown) including a negative electrode active material. Although the first active material portion 311 of the first electrode plate 310 may be exposed outside in FIG. 5, the electrode assembly 300 may also be wound such that the second active material portion of the second electrode plate 320 is exposed outside.

The first electrode tab group 330 may include a plurality of first electrode tabs 331, and the second electrode tab group 340 may include a plurality of second electrode tabs 341.

The first electrode tabs 331 of the first electrode tab group 330 may have the same width X, and side surfaces of the first electrode tabs 331 may be parallel to each other.

The second electrode tabs 341 of the second electrode tab group 340 may have the same width. The width of the second electrode tabs 341 may be identical to the width X of the first electrode tabs 331. However, according to another embodiment, the width of the second electrode tabs 341 may also be different from the width of the first electrode tab 331. Side surfaces of the second electrode tabs 341 may be parallel to each other.

The cylindrical electrode assembly 300 can be placed in a container such as a cylindrical can and an electrolyte can then be injected into the container. The container can be sealed, thereby manufacturing a battery. In this regard, each of the first electrode tab group 330 and the second electrode tab group 340 can include a plurality of electrode tabs. Through the electrode tabs, the battery may be easily charged and discharged with a high-capacity current.

FIGS. 6A through 6D sequentially explain processes of the method described with reference to FIG. 5.

Figure 6A:
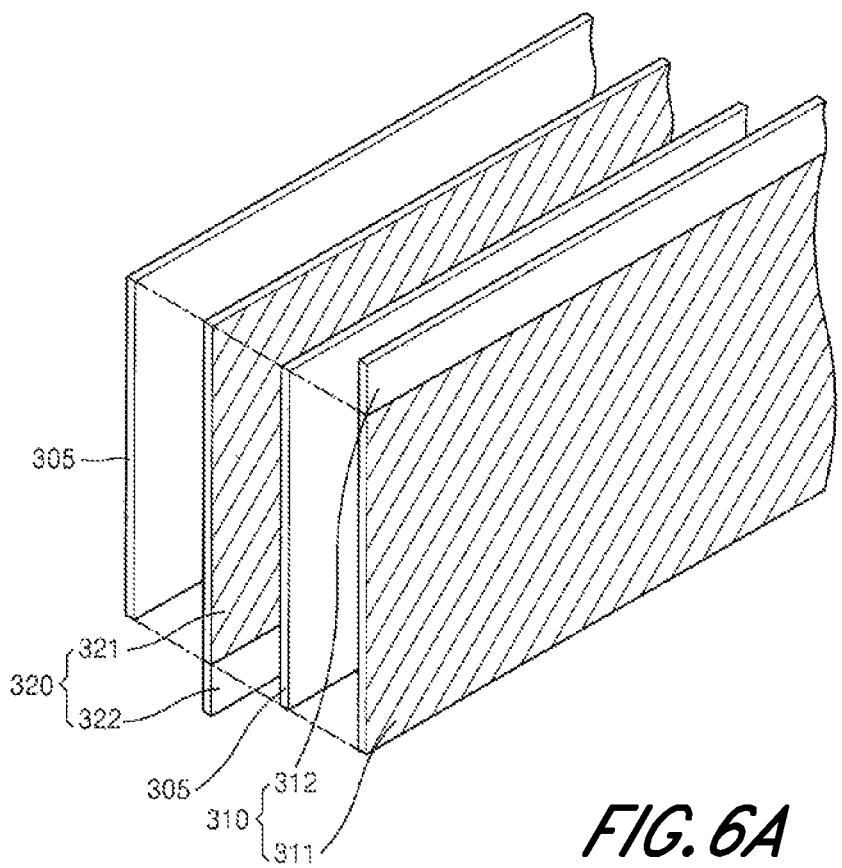

Referring to FIG. 6A, the first electrode plate 310, the separator 305, and the second electrode plate 320 are prepared for stacking.

The first electrode plate 310 can include a first active material portion 311 which further includes a positive electrode active material and a first un-coated portion 312 that does not include the positive electrode active material. For example, the first electrode plate 310 may be formed by coating a positive electrode active material on a predetermined portion of a metal thin plate such as an aluminum thin plate. In this regard, a portion that is coated with the positive electrode active material is referred to as the first active material portion 311, and a portion that is not coated is referred to as the first un-coated portion 312. The positive electrode active material may include, for example, a mixture including a lithium-based oxide, a binder, a plasticizer, and a conducting agent.

The first un-coated portion 312 may be disposed on a top side of the first active material portion 311, have a predetermined height, extend in a lengthwise direction of the first electrode plate 310, and contact a top surface of the first active material portion 311.

In the present illustrated embodiment, the first un-coated portion 312 and the first electrode plate 310 may be integrally formed. However, embodiments of the present invention are not limited thereto. For example, the first electrode plate 310 and the first un-coated portion 312 may be separately formed, and then, the first un-coated portion 312 may be connected to the first electrode plate 310. The connection method may vary; for example, a welding method may be used.

The second electrode plate 320 can include a second active material portion 321 which further includes a negative electrode active material and a second un-coated portion 322 that does not include the negative electrode active material. For example, the second electrode plate 310 may be formed by coating a negative electrode active material on a predetermined portion of a metal thin plate, such as a copper or nickel thin plate. In this regard, a portion that is coated with the negative electrode active material is referred to as the second active material portion 321, and a portion that is not coated is referred to as the second un-coated portion 322. The negative electrode active material may include, for example, a mixture including a carbonaceous material, a binder, a plasticizer, and a conducting agent.

The second un-coated portion 322 may be disposed on a bottom side of second active material portion 321, have a predetermined height, extend the lengthwise direction of the second electrode plate 320, and contact a bottom surface of the second active material portion 321.

In the present illustrated embodiment, the second un-coated portion 322 and the second electrode plate 320 may be integrally formed. However, embodiments of the present invention are not limited thereto. For example, the second electrode plate 320 and the second un-coated portion 322 may be separately formed, and then the second un-coated portion 322 may be connected to the second electrode plate 320. The connection method may vary, for example, a welding method may be used.

Referring to FIG. 6A, the first un-coated portion 312 can contact the top surface of the first active material portion 311 and the second un-coated portion 322 can contact the bottom surface of the second active material portion 321. However, embodiments of the present invention are not limited thereto. For example, the first un-coated portion 312 may contact a bottom surface of the first active material portion 311 and the second un-coated portion 322 may contact a top surface of the second active material portion 321.

When the first electrode plate 310 and the second electrode plate 320 are stacked and wound, the separator 305 may be used to prevent the first electrode plate 310 and the second electrode plate 320 from being electrically connected to each other. The separator 305 may include any material that has good insulating characteristics and is flexible.

Figure 6B:
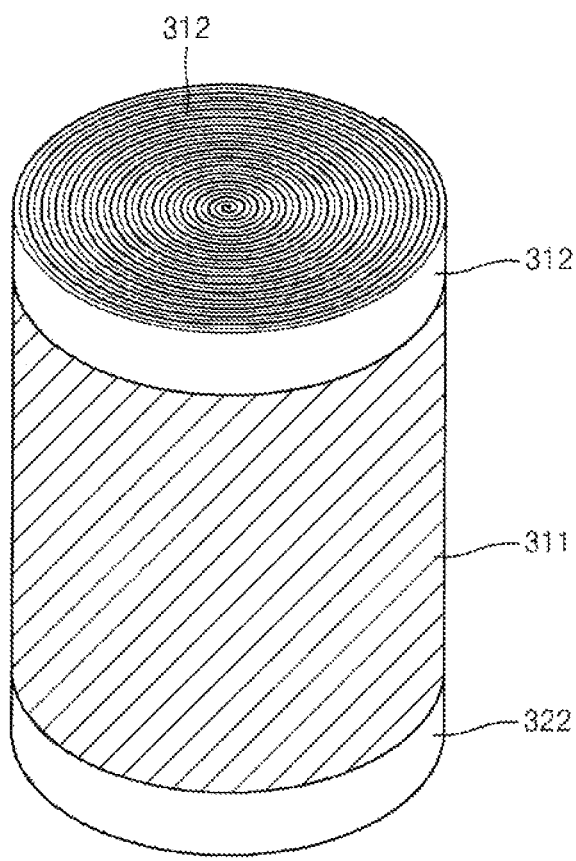

Then, referring to FIG. 6B, the stack including the first electrode plate 310, the second electrode plate 320 and the separator 305 can be wound. Referring to FIG. 6B, the first electrode plate 310, the second electrode plate 320, and the separator 305 can be wound while the first electrode plate 310 is exposed outside, thereby exposing the first active material portion 311 of the first electrode plate 310. However, embodiments of the present invention are not limited thereto. For example, the first electrode plate 310, the second electrode plate 320, and the separator 305 may be wound while the second electrode plate 320 is exposed outside, thereby exposing the second active material portion 321 of the second electrode plate 320.

The first un-coated portion 312 may be exposed on the top side of the first active material portion 311, and the second un-coated portion 322 may be exposed on the bottom side of the second active material portion 321.

Then, the other portion of each of the first un-coated portion 312 and the second un-coated portion 322 other than a predetermined portion may be removed to form electrode tabs.

Figure 6C:
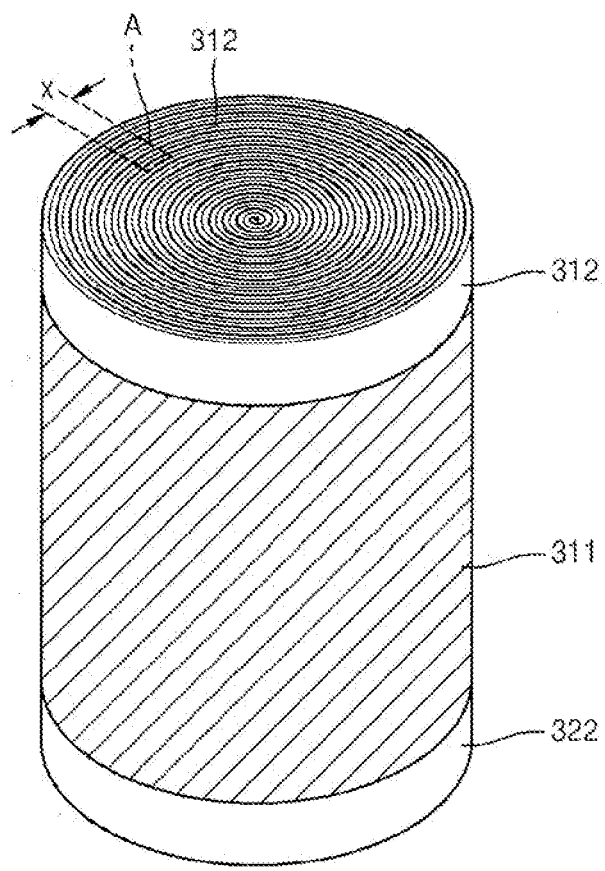

FIG. 6C schematically illustrates a portion of the first un-coated portion 312 that can be removed. Referring to FIG. 6C, a region A is defined by a dashed line. The region A has a width X. Since the width X corresponds to the width of the electrode tabs in the subsequent process, the width X of the region A may be determined according to a desired width of the electrode tabs. In addition, the width X of the region A may also be determined according to the number of electrode tabs of an electrode tab group.

Although not illustrated, a portion of the second un-coated portion 322 which can be removed is also marked as described above. In order to obtain the electrode tabs having the same size, the second un-coated portion 322 may also have a region having the same size as the region A of the un-coated portion 312.

Figure 6D:
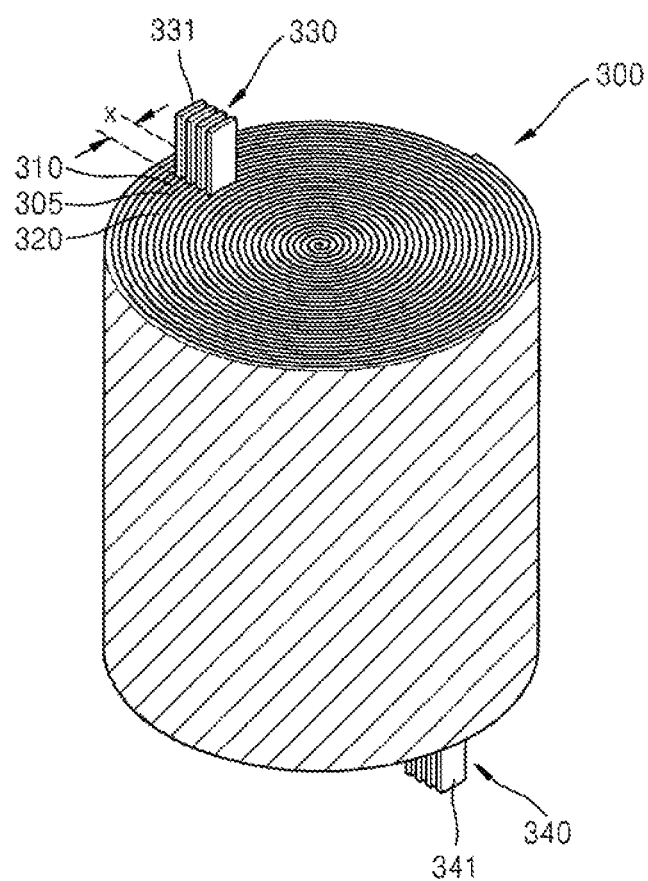

Then, referring to FIG. 6D, the region of the first un-coated portion 312 other than the region A may be removed. That is, only in the region A, the first un-coated portion 312 can contact the first active material portion 311. Thus, the first electrode tab group 330 having the first electrode tabs 331 having the same width X can be formed.

Likewise, a predetermined portion of the second un-coated portion 322 may be removed to form the second electrode tab group 340, including the second electrode tabs 341 having the same width. As described above, the portion of the second un-coated portion 322 other than the region having the same size as the region A of the un-coated portion 312 may be removed such that the second electrode tabs 341 have the same shape as the first electrode tab 331.

The process of removing predetermined portions of the first un-coated portions 312 and the second un-coated portions 322 may be a cutting process using a laser. However, embodiments of the present invention are not limited. For example, a blanking process using a mold may also be used.

Thus, the electrode assembly 300 including the first electrode tab group 330 and the second electrode tab group 340 can be manufactured.

The electrode assembly 300 can include the first electrode tabs 331 connected to the first electrode plate 310, and the second electrode tabs 341 connected to the second electrode plate 320. In the present illustrated embodiment, a plurality of tabs may be formed by using an un-coated portion that extends, instead of un-coated portions that are patterned to be spaced apart from each other by predetermined distances. In addition, since the un-coated portion is removed while a predetermined portion of the un-coated portion remains, using, for example, a laser apparatus after winding, electrode tabs having a desired shape may be easily formed. For example, the first electrode tab group 330 having first electrode tabs 331 having the same width and parallel side surfaces may be easily formed, and the second electrode tab group 340 may also be easily formed likewise.

In the present illustrated embodiment, the first un-coated portion 312 and the first electrode plate 310 may be integrally formed, and thus, the first electrode tab group 330 and the first electrode plate 310 may be integrally formed. Likewise, the second un-coated portion 322 and the second electrode plate 320 may be integrally formed, and thus, the second electrode tab group 340 and the second electrode plate 320 may be integrally formed. Alternatively, as described above, the first un-coated portion 312 and the first electrode plate 310 may be separately formed and then, the first un-coated portion 312 may be connected to the first electrode plate 310. The second un-coated portion 322 and the second electrode plate 320 may be separately formed, and the second un-coated portion 322 may be connected to the second electrode plate 320.

FIG. 7 is a schematic perspective view of an electrode assembly 400 for a rechargeable battery, manufactured by using a method according to another embodiment of the present invention.

Referring to FIG. 7, the electrode assembly 400 may be manufactured by winding in such a manner that the electrode assembly 400 has flat side surfaces. The electrode assembly 400 according to the present embodiment is the same as the electrode assembly 300 of FIG. 5, except for the winding shape of the electrode assembly 400. Thus, elements of the electrode assembly 400 will not be described in detail.

The electrode assembly 400 illustrated in FIG. 5 may be placed in a container such as a rectangular can or a pouch, and an electrolyte is injected into the container. The container may then be sealed, thereby manufacturing a battery. In this regard, each of the first electrode tab group 430 and the second electrode tab group 440 can include a plurality of electrode tabs. Through the electrode tabs, the battery may be easily charged and discharged with a high-capacity current.

FIGS. 8A through 8D sequentially explain processes of the method described with reference to FIG. 7.

Figure 8A:
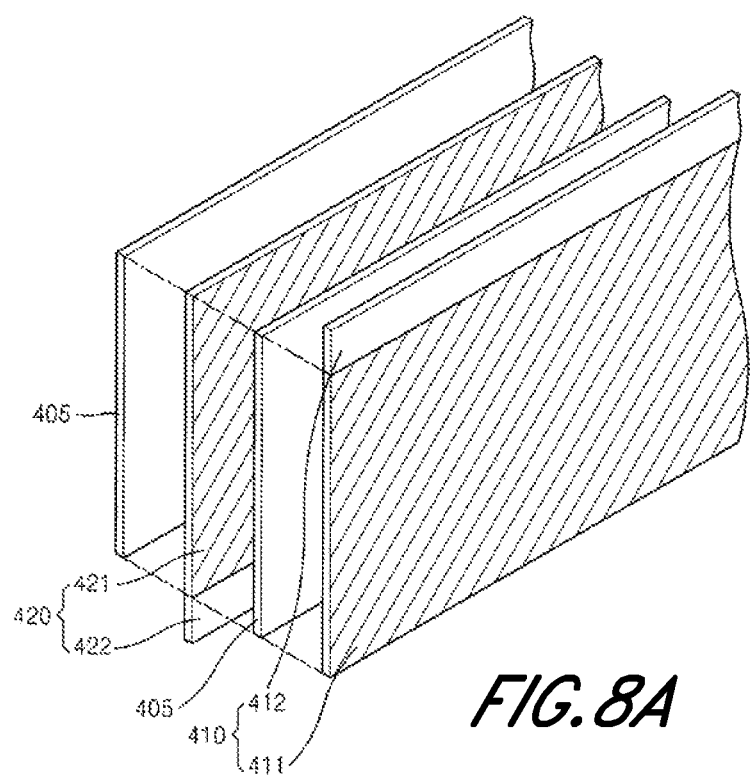

Referring to FIG. 8A, the first electrode plate 410, the separator 405, and the second electrode plate 420 are prepared for stacking.

The first electrode plate 410, the separator 405, and the second electrode plate 420 respectively correspond to the first electrode plate 310, the separator 305, and the second electrode plate 320, which are illustrated in FIG. 3. Accordingly, the first electrode plate 410, the separator 405, and the second electrode plate 420 will not be described in detail in the present embodiment.

Like in the electrode assembly 300 according to the previously described embodiment, the first electrode plate 410 and a first un-coated portion 412 may be integrally formed. Alternatively, the first un-coated portion 412 may be separately formed and then connected to the first electrode plate 410. Likewise, the second electrode plate 420 and a second un-coated portion 422 may be integrally formed. Alternatively, the second un-coated portion 422 may be separately formed, and then connected to the second electrode plate 420.

Figure 8B:
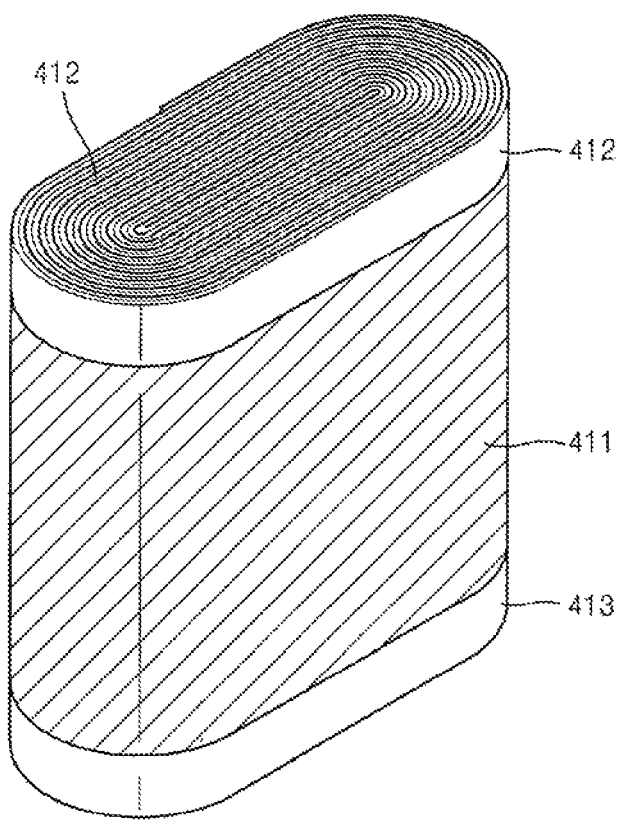

Then, referring to FIG. 8B, the stack including the first electrode plate 410, the second electrode plate 420, and the separator 405 may be wound. Referring to FIG. 8B, the first electrode plate 410, the second electrode plate 420, and the separator 405 may be wound while the first electrode plate 410 is exposed outside, thereby exposing the first active material portion 411 of the first electrode plate 410. However, embodiments of the present invention are not limited thereto. For example, the first electrode plate 410, the second electrode plate 420, and the separator 405 may be wound while the second electrode plate 420 is exposed outside, thereby exposing the second active material portion 421 of the second electrode plate 420.

In the present embodiment, in order to manufacture an electrode assembly for a rectangular or pouch type battery, the first electrode plate 410, the second electrode plate 420, and the separator 405 can be stacked and then wound such that the stack structure has flat side surfaces.

The first un-coated portion 412 may be exposed on a top side of the first active material portion 411, and the second un-coated portion 422 may be exposed on a bottom side of the second active material portion 421.

Then, the other region of each of the first un-coated portion 412 and the second un-coated portion 422 other than a pre-determined region may be removed, thereby forming electrode tabs.

Figure 8C:
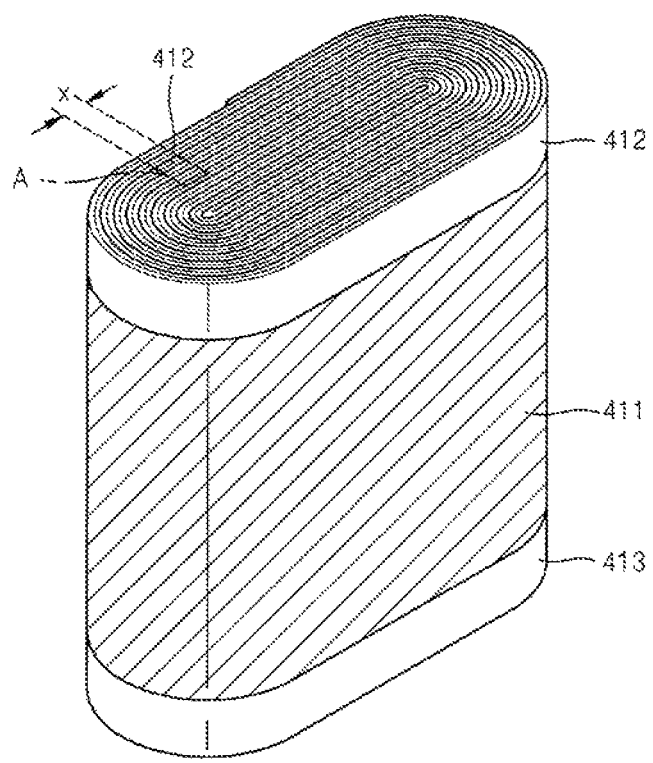

FIG. 8C schematically illustrates a portion of the first un-coated portion 412 which can be removed. Referring to FIG. 8C, a region A may be defined by a dashed line. The region A has a width X. Since the width X corresponds to the width of the electrode tabs in the subsequent process, the width X of the region A may be determined according to a desired width of the electrode tabs. In addition, the width X of the region A may also be determined according to the number of electrode tabs of an electrode tab group.

Although not illustrated, a portion of the second un-coated portion 422 which can be removed is also be marked as described above. In order to obtain the electrode tabs having the same size, the second un-coated portion 422 may also have a region having the same size as the region A of the un-coated portion 412.

Figure 8D:
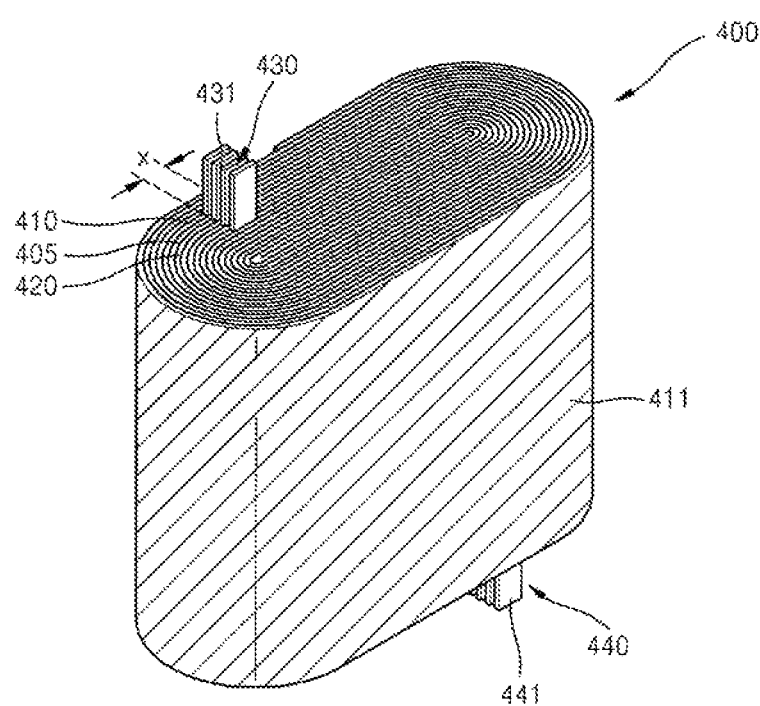

Then, referring to FIG. 8D, the region of the first un-coated portion 412 other than the region A can be removed. That is, only in the region A, the first un-coated portion 412 contacts the first active material portion 411. Thus, the first electrode tab group 430 having the first electrode tabs 431 having the same width X can be formed.

Likewise, a predetermined portion of the second un-coated portion 422 can be removed to form the second electrode tab group 440 including the second electrode tabs 441 having the same width. As described above, the portion of the second un-coated portion 422 other than the region having the same size as the region A of the un-coated portion 412 can be removed such that the second electrode tabs 441 have the same shape as the first electrode tabs 431.

Thus, the electrode assembly 400 including the first electrode tab group 430 and the second electrode tab group 440 can be manufactured.

The electrode assembly 400 may include the first electrode tabs 431 connected to the first electrode plate 410, and the second electrode tabs 441 connected to the second electrode plate 420. In the present illustrated embodiment, a plurality of tabs may be formed by using an un-coated portion that extends, instead of un-coated portions that are patterned to be spaced apart from each other by predetermined distances. In addition, since the un-coated portion may be removed while a predetermined portion of the un-coated portion remains, using, for example, a laser apparatus after winding, electrode tabs having a desired shape may be easily formed. For example, the first electrode tab group 430 having first electrode tabs 431 having the same width and parallel side surfaces may be easily formed, and the second electrode tab group 440 may also be easily formed likewise.

In the present embodiment, the first un-coated portion 412 and the first electrode plate 410 may be integrally formed, and thus, the first electrode tab group 430 and the first electrode plate 410 may be integrally formed. Likewise, the second un-coated portion 422 and the second electrode plate 420 may be integrally formed, and thus, the second electrode tab group 440 and the second electrode plate 420 may be integrally formed. Alternatively, as described above, the first un-coated portion 412 and the first electrode plate 410 may be separately formed and then, the first un-coated portion 412 may be connected to the first electrode plate 410. The second un-coated portion 422 and the second electrode plate 420 are separately formed and then, the second un-coated portion 422 may be connected to the second electrode plate 420.

The embodiments described therein should be considered in a descriptive sense only and not for purposes of limitation. Descriptions of features or aspects within each embodiment should typically be considered as available for other similar features or aspects in other embodiments.

What is claimed is:

1. A method of manufacturing an electrode assembly for a rechargeable battery comprising:
   providing a first electrode plate having a length comprising an active portion that is coated with a first active material and an inactive portion extending from an edge of the active portion of the first electrode plate so as to define a first plurality of tabs of a first width less than the length of the first electrode plate;
   providing a second electrode plate having a length comprising an active portion that is coated with a second active material and an inactive portion extending from an edge of the active portion of the second electrode plate so as to define a plurality of tabs of a second width less than the length of the second electrode plate;
   providing a separator;
   winding the first electrode plate, the second electrode plate and the separator, the separator interposed between the first and second electrode plates so that the first plurality of tabs are positioned proximate each other in the radial direction and so that the second plurality of tabs are positioned proximate each other in the radial direction; and
   determining a third width of the adjacent first plurality of tabs where portions of all of the first plurality of tabs overlap;
   determining a fourth width of the adjacent second plurality of tabs where portions of all of the second plurality of tabs overlap;
   removing parts of the first plurality of tabs of the first electrode plate that do not overlap to form a first plurality of tabs that overlap having the third width less than the first width and removing parts of the second plurality of tabs of the second electrode plate that do not overlap to form the second plurality of tabs that overlap having a forth width less than the second width to form a first plurality of electrode tabs for the first electrode plate and a second plurality of electrode tabs for the second electrode plate.

2. The method of claim 1, wherein the inactive portions of the first and second electrode plates are removed so that the first plurality of electrode tabs are aligned in a radial direction and have side surfaces that are substantially parallel to each other, and the second plurality of electrode tabs are aligned in a radial direction and have side surfaces that are substantially parallel to each other.

3. The method of claim 1, wherein each tab in the plurality of tabs for the first electrode plate has the same width, and each tab in the plurality of tabs for the second electrode plate has the same width.

4. The method of claim 3, wherein each tab in the plurality of tabs for the first electrode plate is equally spaced from each other, and each tab in the plurality of tabs for the second electrode plate is equally spaced from each other.

5. The method of claim 1, wherein removing parts of the inactive portion of the first electrode plate and the inactive portion of the second electrode plate causes the plurality of tabs for the first electrode plate to substantially align in a radial direction to form the first plurality of electrode tabs for the first electrode plate, and the second plurality of tabs for the second electrode plate to substantially align in a radial direction to form the plurality of electrode tabs for the second electrode plate.

6. The method of claim 1, wherein the first and second pluralities of electrode tabs are positioned on a top side of the electrode assembly.

7. The method of claim 1, wherein the inactive portions of the first and second electrode plates are integral with the active portions of the first and second electrode plates, respectively.

8. The method of claim 1, wherein the inactive portions of the first and second electrode plates are formed separately from the active portions of the first and electrode plates, respectively, and joined to the edges of the active portions of the first and second electrode plates, respectively.

9. The method of claim 1, wherein removing parts of the inactive portion of the first electrode plate and the inactive portion of the second electrode plate is performed by a cutting process using a laser.

10. The method of claim 1, wherein removing parts of the inactive portion of the first electrode plate and the inactive portion of the second electrode plate is performed by a blanking process using a mold.

* * * * *